(12) United States Patent
Boda et al.

(10) Patent No.: US 7,062,222 B2
(45) Date of Patent: Jun. 13, 2006

(54) INITIATING A WIRELESS CONNECTION TO A BROADCAST PROGRAM

(75) Inventors: Peter Pal Boda, Helsinki (FI); Petteri J. Saarinen, Helsinki (FI)

(73) Assignee: Nokia Corporation (FI)

( * ) Notice: Subject to any disclaimer, the term of this patent is extended or adjusted under 35 U.S.C. 154(b) by 0 days.

(21) Appl. No.: 10/015,780

(22) Filed: Dec. 17, 2001

(65) Prior Publication Data
US 2003/0114145 A1    Jun. 19, 2003

(51) Int. Cl.
*H04H 1/00* (2006.01)
(52) U.S. Cl. .............. 455/3.05; 455/3.01; 455/3.04
(58) Field of Classification Search ...... 455/3.01–3.06; 725/86–87, 62, 91, 98, 104; 705/1, 12, 14, 705/26
See application file for complete search history.

(56) References Cited

U.S. PATENT DOCUMENTS

| | | | | |
|---|---|---|---|---|
| 4,974,252 A | * | 11/1990 | Osborne | 379/92.01 |
| 5,303,393 A | * | 4/1994 | Noreen et al. | 455/3.2 |
| 5,539,635 A | | 7/1996 | Larson, Jr. | |
| 5,805,155 A | * | 9/1998 | Allibhoy et al. | 725/115 |
| 5,812,931 A | * | 9/1998 | Yuen | 725/123 |
| 5,825,884 A | * | 10/1998 | Zdepski et al. | 705/78 |
| 5,877,755 A | * | 3/1999 | Hellhake | 725/114 |
| 5,907,322 A | | 5/1999 | Kelly et al. | 345/327 |
| 5,991,737 A | * | 11/1999 | Chen | 705/26 |
| 6,078,348 A | * | 6/2000 | Klosterman et al. | 725/40 |
| 6,199,206 B1 | * | 3/2001 | Nishioka et al. | 725/51 |
| 6,246,672 B1 | * | 6/2001 | Lumelsky | 370/310 |
| 6,678,501 B1 | | 1/2004 | Valeski | |
| 2002/0118676 A1 | * | 8/2002 | Tonnby et al. | 370/352 |

FOREIGN PATENT DOCUMENTS

| | | |
|---|---|---|
| EP | 0 565 947 B1 | 5/1997 |
| WO | WO 97/21291 | 6/1997 |
| WO | WO 97/33434 | 9/1997 |
| WO | WO 98/15075 | 4/1998 |
| WO | WO 99/04568 | 1/1999 |
| WO | WO 99/35809 | 7/1999 |
| WO | WO 00/46944 | 8/2000 |

* cited by examiner

*Primary Examiner*—Quochien B. Vuong
*Assistant Examiner*—Tuan Tran
(74) *Attorney, Agent, or Firm*—Banner & Witcoff, Ltd.

(57) ABSTRACT

A method and system for users to select and participate in call-in broadcast programs are disclosed. A user speaks a station name into a mobile device, providing an indication that the request is for a broadcast channel, to tune the mobile device to that channel. The user initiates a request to contact a show by inputting an indication that the user would like to contact the show. The mobile device sends the request to a call server, which looks up the show's contact information based on the current channel being received by the mobile device, and forwards the request to a show representative. The show representative screens calls and provide automated responses. When the show's representative accepts a request to contact the show, the call server initiates a connection between the mobile device and a telephone or other device associated with the show. Once the connection has been established, the call server withdraws from the connection, allowing the user to communicate with the show representative.

58 Claims, 3 Drawing Sheets

INITIATING A WIRELESS CONNECTION TO A BROADCAST PROGRAM

FIELD OF THE INVENTION

The invention relates generally to mobile telecommunications networks. More specifically, the invention provides a method and system for initiating a connection between a mobile terminal and a call-in show based on a current channel to which the mobile terminal is tuned.

BACKGROUND OF THE INVENTION

Call-in radio and television talk shows often provide a telephone number or email address through which listeners or viewers can contact the show (e.g., to talk to the show's host while the show is on the air). Radio call-in shows typically provide the call-in telephone number by announcing it over the air. If an audience member does not hear the telephone number, e.g., because the audience member tuned into the show already in progress, then the audience member cannot call in to the show. In addition, telephone numbers are often spoken very fast, leading to the possibility that a listener may not be able to write down the number, especially while driving a car or when the listener's eyes and/or hands are busy.

Even when an audience member does call a show, the audience member must often redial the number many times before getting through due to high volumes of calls being placed to the call-in number at the same time. When the audience member does get through, the call is often placed in a long queue, and the audience member must then wait for long periods of time before speaking to an operator or other person(s) handling incoming telephone calls, because the show's host rarely handles incoming calls.

Call-in programs often use commercial or third party call centers to handle and/or screen incoming telephone calls. The call center typically must employ many paid operators who each answer calls, screen callers for appropriate subject matter and/or applicability of the caller to the show's theme or subject matter.

One known partial solution to the above problems is to store the telephone number for the call-in program in the mobile terminal's memory or phonebook. The user can then dial the number by recalling the number from the phonebook. However, recalling a telephone number from memory can be tedious as the user navigates through the phonebook using the keys on the mobile terminal. Alternatively, the user may store the telephone number in voice selectable memory, and dial the number by speaking a name associated with the stored telephone number. This does not, however, alleviate all the problems recited above. The user must still remember the phone number long enough to enter it into the phonebook. In addition, the same shows often use different telephone numbers each day.

Thus, it would be an advancement in the art to provide a method and system that audience members could use to call in to a call-in show without being required to receive and/or remember a telephone number. It would be a further advancement in the art to provide an automated system for receiving calls from audience members, and to handle the calls with little human assistance.

BRIEF SUMMARY OF THE INVENTION

As more sophisticated mobile devices are developed, the same mobile device can be used for mobile telephony as is used for receiving radio and/or television broadcasts. For example, 3G cellular devices may receive radio as well as perform traditional mobile telephony operations. The invention provides a method, system, and mobile terminal for user participation in call-in broadcast programs, such as call-in radio and television shows, using such a device.

A central call server can be used to receive requests from mobile terminals and forward each request to the proper broadcast program. When a user wants to call in to a show, the user inputs a generic command into her mobile terminal to contact the studio, and the mobile terminal sends the request to the call server. The request can include an indication of the present channel that the user is listening to or viewing on the mobile terminal. Upon receiving the request, the call server may use a lookup table to identify a show being broadcast on the indicated channel, and forwards the user request to the identified show. A show representative, such as the host, receives the requests, decides whether to accept or reject each one, and sends a response to the call server. Alternatively, a computer can automatically filter requests, for example, by accepting requests at random. When the request is accepted, the call server establishes a connection between the user's mobile terminal and a terminal associated with the show.

A mobile device may be adapted for use with the inventive system by including a predetermined input device that initiates a request to the call server. When a user activates the input device, such as a button or predefined verbal command, e.g. "Contact Show", the mobile terminal sends a request to the call server, which proceeds as described above.

A user can automatically tune to a radio or TV station, or any future broadcast means, by uttering the name of the station into the mobile terminal. The verbal identification may be preceded or accompanied by an indication that the verbal request is for a radio or TV station so that the mobile terminal does not need to compare the verbal input to non-radio and/or non-TV information, e.g., to names stored in the device's phone number directory.

DETAILED DESCRIPTION OF THE INVENTION

Figure 1:
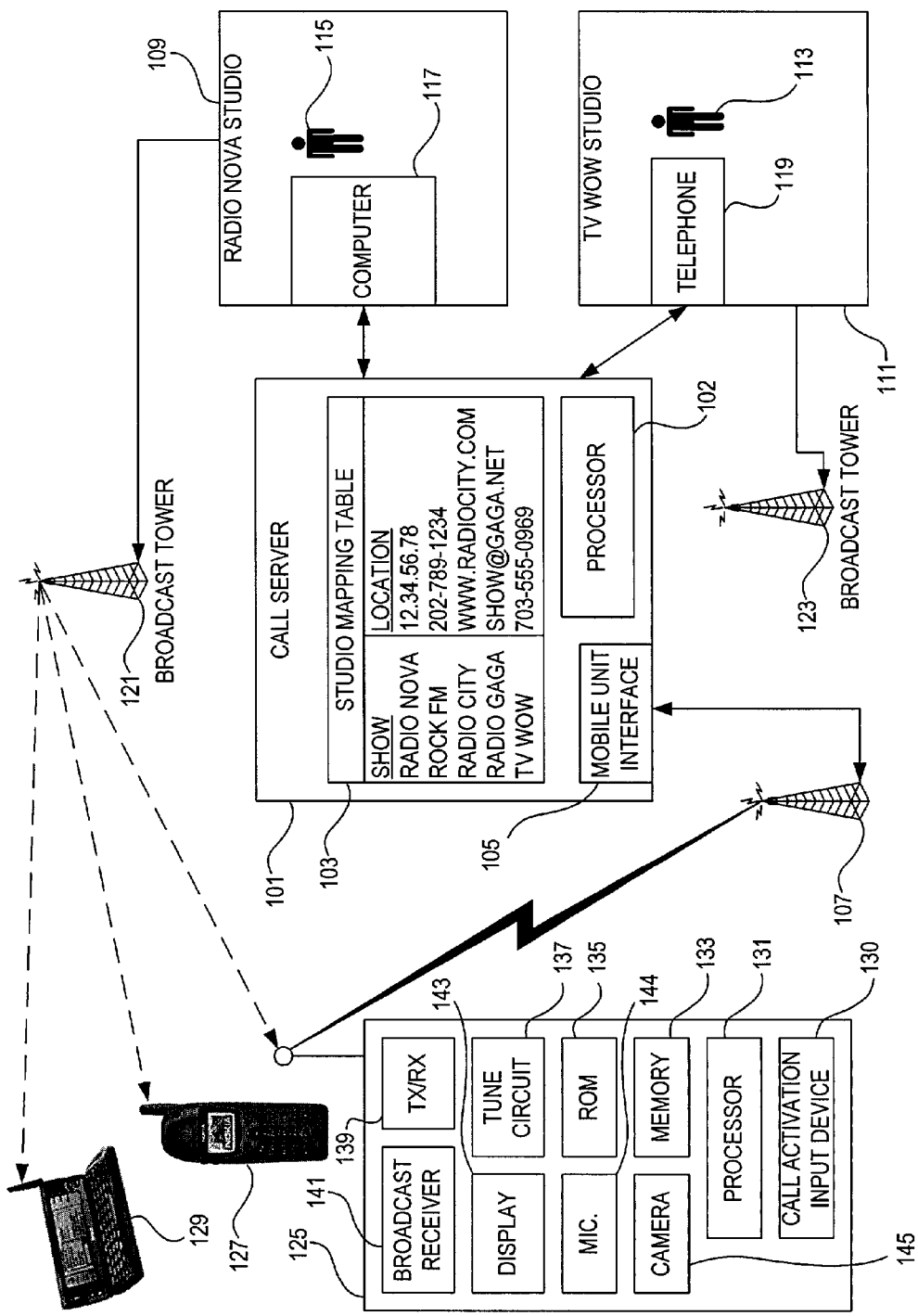
FIG. 1 illustrates a block diagram of an automated call-in system according to an embodiment of the invention.

FIG. 1 illustrates a block diagram of a call-in system according to an embodiment of the invention. The system generally includes one or more broadcast studios, a call-in server, and one or more mobile terminals. A mobile terminal user hears a broadcast inciting listeners to call in to the program. By pressing a button, the mobile terminal communicates with the call server to establish a connection to the program.

A call server 101 may be implemented in a conventional computer acting as a central server for processing call-in requests. Alternatively, call server 101 may be distributed among multiple computers to reduce the load of any single server, depending on the size of the network within which the call server is used. In addition to traditional computer components and modules such as processor 102, call server 101 may include a studio mapping table 103 and mobile device interface 105. Studio mapping table 103 stores a list of call-in broadcast programs and their respective studio access information, so that call server 101 may contact call-in shows based on callers' requests. The call server may contact each call-in program via telephone (voice or data connection), email, URL, or the like, as defined by each particular show's access information. It should be appreciated by one of skill in the art that other contact means may alternatively be used. For instance, the call server may contact a show representative using SMS or HTTP messages, TTS (text-to-speech) announcements, and the like.

Call server 101 may be connected to a wireless communications network 107, through which the call server receives users' requests to contact a call-in program's studio. Call server 101 may further be connected to one or more radio and/or TV call-in program studios 109 and 111, to which call server 101 sends user requests. Each call-in program may have a show representative 113, 115. The show representative may be the individual hosting the show, or any other individual designated to receive and respond to users' call-in requests. Each show representative 113, 115 may receive and filter requests using a computer 117, a telephone 119, or other data processing device configured to receive and respond to users' requests to contact the studio. Each studio 109, 111 may be connected to a broadcast tower 121, 123, respectively, through which the call-in program is publicly or privately broadcast. Alternatively, programs may be broadcast to mobile terminals via data packets sent over a network (e.g., IP packets sent over the Internet), such as is known in the art with respect to Internet radio/TV broadcasting.

Each broadcast may be received by a mobile terminal 125, 127, and 129. Each mobile terminal may comprise a handheld mobile telephone 127, personal digital assistant (PDA) (e.g., a Palm VII), a combination of the two such as a Nokia Communicator 129, mobile MP3 player, integrated multimedia player in an automobile, or the like, that is equipped with two-way wireless communications and is adapted to receive radio and/or TV broadcasts. For purposes of illustration only, mobile terminal 125 represents any of the aforementioned devices. In one embodiment, mobile device 125 may receive radio data stream (RDS) messages indicating that the user can call in to the studio using a "call studio" input device 130 on device 125, as further described below. Alternatively, the call-in show may announce over the radio that audience members may call in to the show. Input device 130 may comprise a keypad key, soft button, switch, or other input device known in the art.

Mobile terminal 125 may also include a processor 131, memory (e.g., RAM, hard disk, etc.) 133, ROM 135, tuning circuit 137, transceiver 139, broadcast receiver 141, display screen 143, microphone 144, and camera 145. Some elements may be optional or combined into one or more other elements. Each element may be performed via hardware, software, or a combination of the two. Software may be stored on a computer readable memory, such as a hard disk, floppy disk, or other computer readable medium. Tuning circuit 137 interprets user input for a selected broadcast station and directs broadcast receiver 141 to tune to the selected station. Transceiver 139 is used for communicating with wireless communications network 107. Display screen 143 may be used for displaying content to the user, such as menus, received DVB or television broadcasts received by broadcast receiver 141, and the like. Microphone 144 may be used to capture audio data into the mobile terminal, and camera 145 may be a digital camera or the like, and may be used to capture video or still image data into the mobile terminal.

Figure 2:
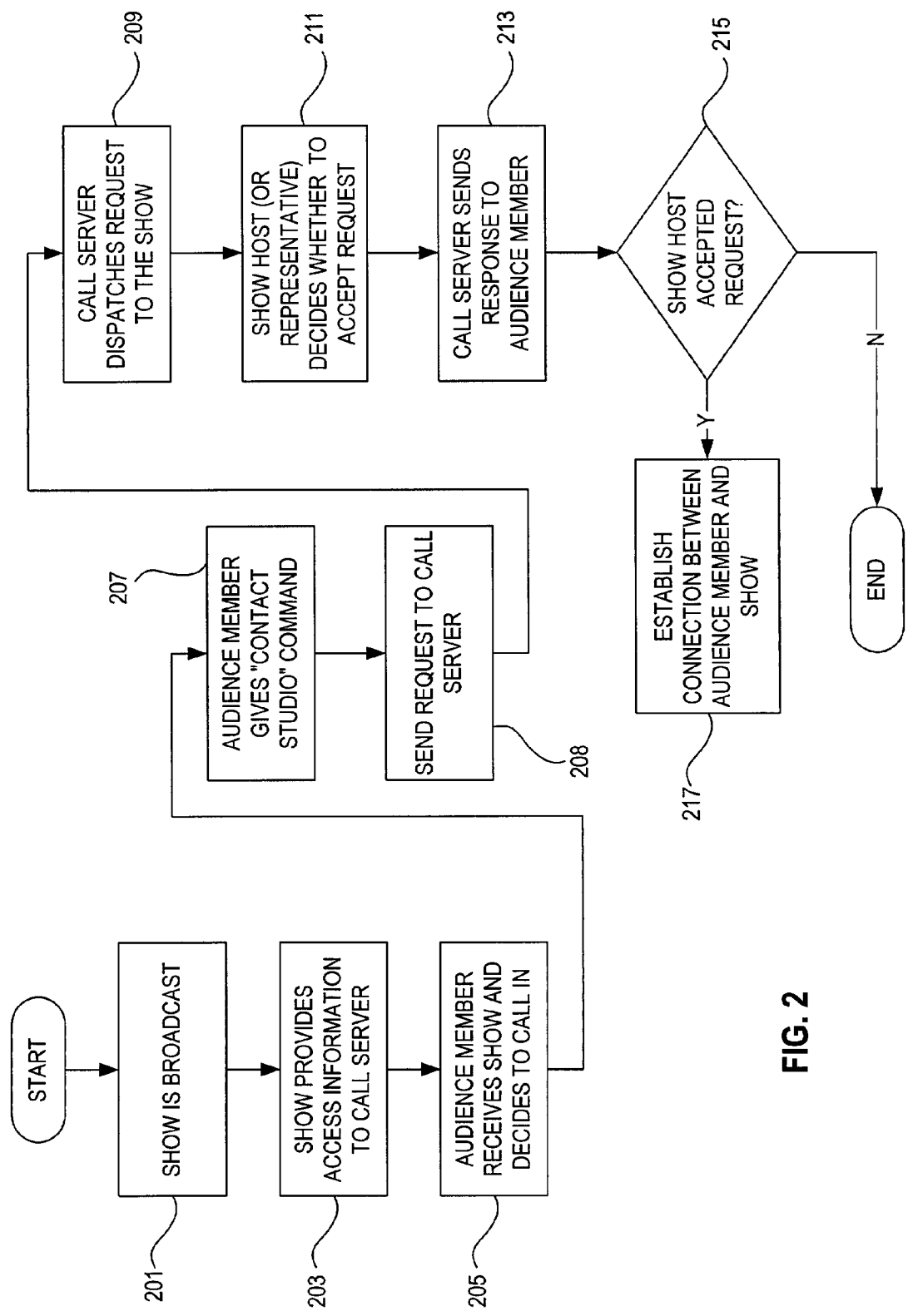
FIG. 2 illustrates a method for performing user participation in a call-in broadcast program according to an embodiment of the invention.

FIG. 2 illustrates a method for user participation in a call-in broadcast program according to an embodiment of the invention. A call-in program, such as a call-in radio show, is broadcast in step 201. In step 203, the show (via the show representative or other designated personnel) provides access information to call server 101. The access information may include a telephone number, an email address, an IP address, a URL, an SMS message address, or the like. In step 205, an audience member listening to or viewing the show decides to contact the show using her mobile device. The audience member, in step 207, inputs a command to contact the show. The command may be provided by pressing call activation input device 130 or any other input device for contacting the studio of a broadcast currently being received, or it may be issued by speaking a command, such as "Contact studio," or the equivalent in a specified implementation language (e.g., Finnish, Spanish, etc.), into a mobile device equipped with voice recognition capabilities. Other known input mechanisms and methods may alternatively be used. For example, in one embodiment it is also possible for the user to contact a radio show to which she is not currently listening. In this case a verbal command specific to a radio show may be spoken into the microphone, such as "Contact Radio Gaga."

Upon instructing the mobile device to contact the studio, the mobile device may automatically send a request to contact the show to the call server in step 208. The mobile device may automatically generate the content (user ID, destination address, etc.) to include in the request message, and send the message via SMS, HTTP, or other known data messaging technique, to the call server. The request may include a present condition of a dynamic variable, such as an indication of the current broadcast being received by the mobile device. The indication of the current broadcast being received may be the radio channel to which the device is tuned, or it may be a show identifier provided by an RDS message. The request may also include user profile information and location information, described below.

In one embodiment, with only one call server, all requests are sent to the one call server. In another embodiment, where there is more than one call server, the wireless communications network routes the request to the appropriate call server (e.g., the closest call server, the call server with the lightest load, etc.). The request to contact the studio may then be processed by the call server based on the dynamic variable information. In one embodiment, the request includes an HTTP message identifying the audience member's mobile device ID, the request type and the current radio channel. In step 209, the call server uses the received information to look up the show's access information, and forwards the request to the show (e.g., to the studio from which the show is originating). The server may send the message to the studio in any known format, including email, SMS, HTTP, phone call with synthesized announcement, etc. Additionally, the request may be forwarded to a computer at the show studio, or to any other call screening device used by the show.

In step 211, the show representative reviews the request and decides whether or not to accept the call-in request from that particular audience member. In one embodiment of the invention, to allow the show representative to make a better-informed decision regarding whether to accept each request, additional information may be included with each request. For instance, requests may include demographical and/or user profile information (age, gender, etc) regarding the requesting audience member. The demographical/user profile information may be automatically added to the request by the mobile telephone provider or the call server, when the information is known, and optionally when the audience member has specifically requested or signed up for such information to be provided. Additionally, the audience member may input a basic description of her request or the subject matter she would like to discuss, for example, via text message, audio clip, or the like.

In one embodiment, the request sent to the show may include location information. The show representative may locate the user based on the location information, and introduce the user to the show's general audience. In various embodiments, the location information may be added by the user, by the mobile terminal when such information is stored in the mobile terminal (e.g., GPS in the mobile terminal), by the call server when such information is stored in the call server, or by a base station in the mobile network when base stations have location determination capabilities (e.g., using techniques such as angle of arrival, time difference of arrival, etc.).

The show representative may send a reject message, a request to establish a voice communication, or other appropriate announcement. For example, the show host may send an announcement to the audience member saying "Thanks for your call, your turn is 10 minutes from now." In one embodiment, the show representative may select from a number of predefined responses in order to expedite call screening. Predefined responses may include responses that immediately accept the request, immediately reject the request, store the request in one or more queues, etc.

In an alternative embodiment, a computer may be used to automatically accept or reject requests according to predefined criteria, e.g., at random, every third request, etc. The predefined criteria may also be based on the demographic information or basic description, when available.

The show representative may input the decision into the screening computer or other device being used to communicate with the call server. The screening computer, in step 213, sends the response back to the call server, which in turn may send the response back to the mobile device from which the initial command to contact the show was received. In step 215, the call server makes a determination of whether the show representative accepted the audience member's request to contact the show and, if so, the call server establishes a connection between the audience member's mobile device and a telephone associated with the show, in step 217. The call may be initiated immediately or at a predefined or otherwise given time. For instance, when the show host accepts a request but informs the requesting audience member that the delay is ten minutes, the call server may wait ten minutes before initiating a connection between the show host and the audience member. In addition, after the call server establishes the connection between the show host and the audience member, the call server may exit the communication, i.e., drop both lines, so that the call server is free to establish other connections and does not remain involved with past connections.

It should be apparent to one of skill in the art that the above steps might not be required to be performed in the order in which they are illustrated. For instance, steps 201 and 203 may be performed in reverse order. In addition, one or more steps may be optional, such as step 213. Also, it is possible that the audience member, in step 205, decides to call in even though she is not listening to the show, as described above. In some embodiments, the show representative may contact the mobile device directly using information contained in the connection request, such as the user ID or contact information.

In one embodiment of the invention, a radio show may want to be contacted even after the show is no longer on the air, e.g. to collect audience members' after-show comments. In such a case the audience member may send information to the call server identifying a specific show or a channel/time combination. Using this information, the call server may look up the show's contact information in table 103 and then proceed as described above. If the call server does not locate a past show based on the information supplied by the audience member, the call server may inform the audience member by sending an error message back to the mobile device from which the request was received.

In one embodiment of the invention, the mobile terminal may send audio or video data to be broadcast as part of the show. For example, a mobile terminal may include captured audio or video data (from microphone 144 or camera 145, respectively) as part of the initial connection request. The show representative may then determine whether to rebroadcast the data via IP broadcast, DVB, or the like. In some embodiments, the data may only be rebroadcast to users who subscribe to the show or to the call server. For example, a mobile user may receive a DVB broadcast of a television talk show. The talk show host might encourage viewers to send in pictures of themselves doing funny things. A mobile user might take a picture with her mobile terminal using the built in digital camera, and send it to the talk show host using the invention described herein. The talk show host may then include the picture as part of the broadcast for the entire viewing audience to see.

Figure 3:
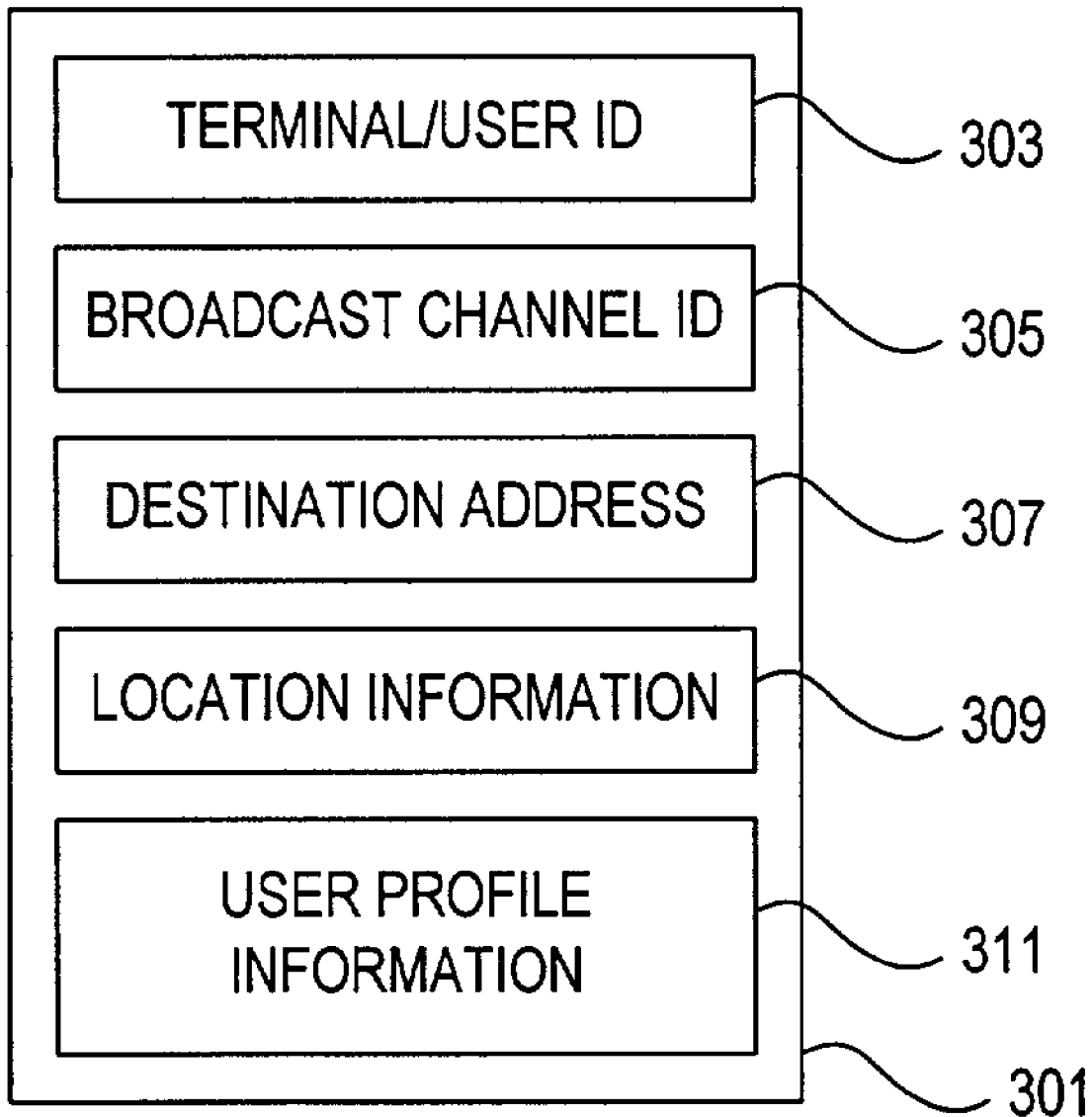
FIG. 3 illustrates a block diagram of a connection request message according to an embodiment of the invention.

With reference to FIG. 3, a message 301 sent by a user to the call server requesting that audio and/or video data be sent to the show representative may include a terminal or user ID 303, a broadcast channel ID 305, a destination address 307, location information 309 (optional), and user profile information 311 (optional). Terminal/User ID 303 may comprise a contact address or some other identification specific to the user and/or the mobile terminal from which the message is originating. Broadcast channel ID 305 may comprise information identifying the broadcast channel to which the message corresponds. Destination address 307 may comprise information identifying where the message should be sent, e.g., a call server number or address. Location information 309 and user profile information 311 (described above) are both optional.

One of skill in the art will appreciate that many variations are possible that remain within the scope of the present invention. For example, the call server may be configured to offer users the option of indicating when they would like their request submitted to the show, and the call server may delay the request according to the user's preference. In another variation, a user may include in the request an indication of whether the user would like to be immediately connected to the show or whether the user would like to schedule a specific time to contact the show.

While the above examples refer to call-in radio and TV programs, the principles taught herein may also be used to receive additional information regarding other types of broadcasts, including advertisements and game shows. For example, when an advertisement is being broadcast that a user wants to learn more about, the user can use the call activation input device 130 (FIG. 1) to request that the call server connect the mobile terminal to a third party associated with the advertisement (e.g., a sales representative). If a sales representative is available, the available sales representative may accept the connection request, and the call server establishes a new connection between the mobile terminal and the sales representative. At that point, the user of the mobile terminal can find out more information and/or order the product being advertised. In such an embodiment, the call server may receive advertisement information from a radio or TV station so that the call server knows presently broadcast advertisements on various channels when requests are received from users. Similarly, when a game show announces that interested people should call in to participate, the game show host (or other representative) may use the inventive system to screen, or randomly accept, potential contestants as discussed above.

It should be apparent to one of skill in the art that, while the above examples are directed to mobile devices, the inventive methods and systems may also be used with non-mobile devices that receive broadcasts and perform telephony operations. In addition, the principles taught herein may also be used with non-wireless systems, such as Internet radio, TV, telephony or any other future broadcast systems.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I/We claim:

1. A call server, comprising:
    a processor;
    memory for storing data comprising:
    a database that correlates information identifying a plurality of broadcast programs to information for contacting each of the plurality of broadcast programs; and
    computer readable instructions that, when executed by the processor, cause the call server to perform a method for establishing a two-way wireless connection, comprising steps of:
    i. receiving from a mobile device a first request to establish a two-way connection between a broadcast program and the mobile device, said first request comprising a current condition of a dynamic variable and comprising additional information about the first request;
    ii. querying the database based on the dynamic variable to retrieve information for contacting the broadcast program corresponding to the dynamic variable;
    iii. sending a second request to establish the two-way connection between a device associated with the broadcast program and the mobile device as requested in the first request, said second request comprising the additional information about the first request;
    iv. receiving a response to the second request from the device associated with the broadcast program for establishing a two-way wireless connection to the mobile device;
    v. when the response indicates acceptance of the second request, establishing the requested two-way wireless connection between the mobile device and the device associated with the broadcast program; and
    vi. exiting from the connection between the device associated with the broadcast program and the mobile device.

2. The call server of claim 1, wherein the contact information comprises a telephone number and, in step (v), the connection is a telephony connection.

3. The call server of claim 1, wherein the contact information comprises an IP address and, in step (v) the connection is a data network connection.

4. The call server of claim 1, wherein the dynamic variable represents a current broadcast channel to which the mobile device is tuned.

5. The call server of claim 1, wherein, in step (iv), the connection response comprises a defined delay time, and wherein the computer readable instructions further comprise the step of waiting for the defined delay time before performing step (v).

6. The call server of claim 5, wherein the defined delay time is defined by the broadcast program.

7. The call server of claim 1, wherein step (i) comprises receiving a text message.

8. The call server of claim 7, wherein step (i) comprises receiving an SMS message.

9. The call server of claim 1, wherein the additional information about the request comprises user information corresponding to a user from whom the first request was received.

10. The call server of claim 1, wherein the additional information about the request comprises a summary of an intended discussion topic.

11. The call server of claim 1, wherein the additional information about the request comprises location information.

12. The call server of claim 1, wherein receiving the connection response comprises receiving an automated response from the device associated with the broadcast program.

13. The call server of claim 1, wherein the computer readable instructions further cause the call server to perform the step of sending to the mobile device connection information to establish a connection between a device associated with the broadcast program and the mobile device from the call server.

14. The call server of claim 1, wherein the additional information comprises a contact address of the mobile device and, in step (v) the connection is a data connection.

15. The call server of claim 1, wherein the additional information comprises a contact address of the mobile device and, in step (v) the connection is a voice connection.

16. The call server of claim 1, wherein the additional information comprises a contact address of the mobile device and, in step (v) the connection is a text message connection.

17. The call server of claim 1, wherein step (i) comprises receiving a message via data messaging.

18. The call server of claim 17, wherein step (i) comprises receiving a HTTP message.

19. A method for establishing a two-way wireless connection, comprising steps of:
    i. a mobile device receiving a broadcast signal;
    ii. the mobile device receiving user input to establish the two-way wireless connection;
    iii. the mobile device sending to a call server a request to contact a second party associated with the broadcast signal, wherein the request comprises a current condition of a dynamic variable based on the broadcast signal;
    iv. the mobile device receiving a response to the request containing connection information from the call server;

v. the mobile device joining a two-way wireless connection to the second party established by the call server; and vi. maintaining the two-way wireless connection between the mobile device and the second party without the call server remaining involved in the two-way wireless connection.

20. The method of claim 19, wherein, in step (iii), the dynamic variable identifies a current broadcast being received by the mobile device via the broadcast signal.

21. The method of claim 20, wherein, in step (iii), the current broadcast comprises an advertisement.

22. The method of claim 20, wherein, in step (iii), the current broadcast comprises a call-in program.

23. The method of claim 19, wherein, in step (v), the connection comprises a telephony connection.

24. The method of claim 19, wherein step (ii) comprises receiving the user input as a verbal command.

25. The method of claim 19, wherein step (iii) comprises sending a text message.

26. The method of claim 25, wherein step (iii) comprises sending an SMS message.

27. A mobile device, comprising:
a processor;
memory storing computer readable instructions that, when executed by the processor, cause the mobile device to perform steps of:
  i. receiving user input to initiate a two-way connection with a device associated with a broadcast program;
  ii. sending a request to call a server to establish a two-way connection between the device associated with the broadcast program and the mobile device comprising a current value of a dynamic variable representing the broadcast program, and comprising additional information about the request;
  iii. when the request is accepted, establishing the two-way connection with the device associated with the broadcast program; and
  iv. maintaining the two-way connection between the mobile device and the device associated with the broadcast program without the call server being involved in the maintained two-way connection.

28. The mobile device of claim 27, wherein in step (ii) the dynamic variable represents a presently tuned broadcast station.

29. The mobile device of claim 28, wherein in step (i) the broadcast program comprises an advertisement.

30. The mobile device of claim 28, wherein in step (i) the broadcast program comprises a call-in program.

31. The mobile device of claim 28, wherein step (i) comprises receiving a verbal command from a user of the mobile device.

32. The mobile device of claim 28, wherein step (ii) comprises sending a text message.

33. The mobile device of claim 32, wherein step (ii) comprises sending an SMS message.

34. The mobile device of claim 27, further comprising instructions for performing the step of, when the request is rejected, receiving a rejection message from the broadcast program.

35. The mobile device of claim 27, wherein in step (iii) the connection comprises a voice connection.

36. The mobile device of claim 27, wherein the additional information about the request comprises user information corresponding to a user of the mobile terminal.

37. The mobile device of claim 27, wherein the additional information about the request comprises a summary of an intended discussion topic.

38. The mobile device of claim 27, wherein the additional information about the request comprises location information.

39. The mobile device of claim 27, wherein the computer readable instructions further cause the mobile device to perform the step of receiving connection information to establish a connection between a device associated with the broadcast program and the mobile device from the call server.

40. A computer readable medium storing computer readable instructions that, when executed by a processor, cause a device to perform steps of:
  i. receiving user input to initiate a two-way connection with a device associated with a broadcast program;
  ii. sending a request, to a call server, comprising a current value of a dynamic variable representing the broadcast program, and comprising additional information about the request;
  iii. receiving a response to the request containing two-way connection information;
  iv. when the request is accepted, establishing the two-way connection with a device associated with the broadcast program; and
  v. maintaining the two-way connection between the device and the device associated with the broadcast program without the call server being involved in the maintained two-way connection.

41. The computer readable medium of claim 40, wherein in step (ii) the dynamic variable represents a presently tuned broadcast station.

42. The computer readable medium of claim 41, wherein in step (i) the broadcast program comprises an advertisement.

43. The computer readable medium of claim 41, wherein in step (i) the broadcast program comprises a call-in program.

44. The computer readable medium of claim 41, wherein step (i) comprises receiving a verbal command from a user of the mobile device.

45. The computer readable medium of claim 41, wherein step (ii) comprises sending a text message.

46. The computer readable medium of claim 45, wherein step (ii) comprises sending an SMS message.

47. The computer readable medium of claim 40, wherein the computer readable instructions further comprise the step of, when the request is rejected, receiving a rejection message.

48. The computer readable medium of claim 40, wherein in step (iii) the connection comprises a voice connection.

49. The computer readable medium of claim 40, wherein in step (ii) the additional information about the request comprises user information corresponding to a user of the device.

50. The computer readable medium of claim 40, wherein in step (ii) the additional information about the request comprises a summary of an intended discussion topic.

51. The computer readable medium of claim 40, wherein in step (ii) the additional information about the request comprises location information.

52. In a mobile terminal, a method of establishing a voice connection between a user of the mobile terminal and a device associated with a broadcast radio program, comprising the steps of:

(i) receiving and demodulating a broadcast signal at the mobile terminal;

(ii) in response to a user-activated command, transmitting a request to establish a voice connection with the device associated with the broadcast radio program, wherein the request includes information that identifies the broadcast radio program;

(iii) receiving from a call server that communicates with the device associated with the broadcast radio program an indication as to whether the request to establish the voice connection has been accepted;

(iv) in response to step (iii), establishing a voice connection with the device associated with the broadcast radio program; and (v) maintaining the voice connection between the mobile terminal and the device associated with the broadcast radio program without the call server remaining involved in the voice connection.

53. A method for establishing a connection with a host of a broadcast program, comprising steps of:

(a) receiving a connection request originating from a mobile terminal, wherein the connection request comprises information about the request;

(b) determining whether to accept the connection request based on the information;

(c) when the connection request is accepted, sending a response to the connection request to the mobile terminal;

(d) establishing an interactive connection between a device associated with the host and the mobile terminal; and (e) exiting from the interactive connection between the device associated with the host and the mobile terminal.

54. The method of claim 53, wherein in step (d) the interactive connection comprises a voice connection.

55. The method of claim 53, wherein in step (d) the interactive connection comprises a data chat connection.

56. The method of claim 53, wherein in step (a) the information comprises user profile information corresponding to a user of the mobile terminal.

57. The method of claim 53, wherein in step (a) the information comprises a summary of an intended discussion topic.

58. The method of claim 53, wherein in step (a) the information comprises location information corresponding to the mobile terminal.

* * * * *